United States Patent
Faraj et al.

(10) Patent No.: US 8,365,186 B2
(45) Date of Patent: Jan. 29, 2013

(54) RUNTIME OPTIMIZATION OF AN APPLICATION EXECUTING ON A PARALLEL COMPUTER

(75) Inventors: Daniel A. Faraj, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 12/760,111

(22) Filed: Apr. 14, 2010

(65) Prior Publication Data

US 2011/0258627 A1   Oct. 20, 2011

(51) Int. Cl.
G06F 9/46 (2006.01)
G06F 15/16 (2006.01)
(52) U.S. Cl. .................. 718/106; 709/201; 709/252
(58) Field of Classification Search .................. None
See application file for complete search history.

(56) References Cited

U.S. PATENT DOCUMENTS

| | | | |
|---|---|---|---|
| 5,063,562 A | 11/1991 | Barzilai et al. | |
| 5,095,444 A | 3/1992 | Motles | |
| 5,491,691 A | 2/1996 | Shtayer et al. | |
| 5,815,793 A | 9/1998 | Ferguson | |
| 5,859,981 A | 1/1999 | Levin et al. | |
| 5,862,381 A | 1/1999 | Advani et al. | |
| 5,912,893 A | 6/1999 | Rolfe et al. | |
| 5,918,020 A | 6/1999 | Blackard et al. | |
| 5,937,201 A | 8/1999 | Matsushita et al. | |
| 5,953,336 A | 9/1999 | Moore et al. | |
| 5,982,771 A | 11/1999 | Caldara et al. | |
| 5,999,734 A | 12/1999 | Willis et al. | |
| 6,057,839 A | 5/2000 | Advani et al. | |
| 6,115,357 A | 9/2000 | Packer et al. | |
| 6,118,777 A | 9/2000 | Sylvain | |
| 6,126,331 A | 10/2000 | Komatsu et al. | |
| 6,167,490 A | 12/2000 | Levy et al. | |
| 6,253,372 B1 | 6/2001 | Komatsu et al. | |
| 6,336,143 B1 | 1/2002 | Diedrich et al. | |
| 6,438,702 B1 | 8/2002 | Hodge | |
| 6,490,566 B1 | 12/2002 | Schmidt | |
| 6,600,721 B2 | 7/2003 | Edholm | |
| 6,633,937 B2 | 10/2003 | Thomson | |
| 6,775,703 B1 | 8/2004 | Burns et al. | |
| 6,839,829 B1 | 1/2005 | Daruwalla et al. | |
| 7,032,224 B2 | 4/2006 | Kadakia et al. | |

(Continued)

OTHER PUBLICATIONS

Faraj, Ahmad et al. "MPI Collective Communications on the Blue Gene/P Supercomputer: Algorithms and Optimizations". 17th IEEE Symposium on High Performance Interconnects. Published in 2009.*

(Continued)

*Primary Examiner* — Emerson Puente
*Assistant Examiner* — Adam Lee
(74) *Attorney, Agent, or Firm* — Biggers & Ohanian, LLP

(57) ABSTRACT

Identifying a collective operation within an application executing on a parallel computer; identifying a call site of the collective operation; determining whether the collective operation is root-based; if the collective operation is not root-based: establishing a tuning session and executing the collective operation in the tuning session; if the collective operation is root-based, determining whether all compute nodes executing the application identified the collective operation at the same call site; if all compute nodes identified the collective operation at the same call site, establishing a tuning session and executing the collective operation in the tuning session; and if all compute nodes executing the application did not identify the collective operation at the same call site, executing the collective operation without establishing a tuning session.

24 Claims, 10 Drawing Sheets

U.S. PATENT DOCUMENTS

| | | |
|---|---|---|
| 7,458,077 B2 | 11/2008 | Duke |
| 7,509,244 B1 | 3/2009 | Shakeri et al. |
| 7,527,558 B2 | 5/2009 | Lavoie et al. |
| 2002/0065930 A1 | 5/2002 | Rhodes |
| 2003/0021287 A1 | 1/2003 | Lee et al. |
| 2004/0111398 A1 | 6/2004 | England et al. |
| 2006/0107262 A1 | 5/2006 | Bodas et al. |
| 2006/0203739 A1 | 9/2006 | Padmanabhan et al. |
| 2007/0179760 A1 | 8/2007 | Smith |
| 2008/0109569 A1 | 5/2008 | Leonard et al. |
| 2008/0240115 A1 | 10/2008 | Briscoe et al. |
| 2009/0003344 A1* | 1/2009 | Kumar .......................... 370/392 |
| 2009/0129277 A1* | 5/2009 | Supalov et al. ............... 370/241 |

OTHER PUBLICATIONS

Faraj, Ahmad et al. "A Study of Process Arrival Patterns for MPI Collective Operations". International Journal of Parallel Programming. Published in 2008.*
Faraj, Ahmad et al. "Automatic Generation and Tuning of MPI Collective Communication Routines". ACM. Published in 2005.*
Willis, "MinSim: Optimized, Compiled VHDL Simulation Using Networked & Parallel Computers", 1993, Proceedings of Fall 1993 VHDL International User's Forumn, pp. 197-144.
Final Office Action, U.S. Appl. No. 11/924,934, Jan. 6, 2012.
Advisory Action, U.S. Appl. No. 11/865,981, Oct. 14, 2011.
Advisory Action, U.S. Appl. No. 11/764,333, Nov. 28, 2011.
Notice of Allowance, U.S. Appl. No. 11/832,192, Aug. 11, 2011.
Office Action, U.S. Appl. No. 12/189,336, Dec. 9, 2011.
Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.
Notice of Allowance Dated Apr. 6, 2010 in U.S. Appl. No. 11/531,846.
Final Office Action Dated Apr. 29, 2010 in U.S. Appl. No. 11/553,040.
Office Action Dated Jul. 12, 2010 in U.S. Appl. No. 11/764,282.
Office Action Dated May 3, 2010 in U.S. Appl. No. 12/180,963.
Nenad Stankovic Kang Zhang, Visual Programming for Message-Passing Systems (1999), International Journal of Software Engineering and Knowledge Engineering.
Matthew J. Sottile, Vaddadi P. Chandu, David A. Bader, Performance analysis of parallel programs via message-passing graph traversal, College of Computing, Georgia Institute of Technology, Feb. 25, 2006.
Office Action, U.S. Appl. No. 11/946,934, Nov. 24, 2010.
Office Action, U.S. Appl. No. 11/924,934, Aug. 19, 2010.
Notice of Allowance, U.S. Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
University of Minnesota Super Computing Institute. 2009. Derived Data Types with MPI.
William Saphir, Message Buffering and It's Effect on the Communications Performance on Parallel Computers. Apr. 1994.
University of Minnesota Super Computing Institute. 2009 MPI Performance Topics.
Final Office Action, U.S. Appl. No. 11/865,981, Jul. 22, 2011.
Huang et al., "DZM: MPI One-Sided Exploitation of LAIP API's Component Design, Communication Protocols & Application Tools Development", Jun. 6, 2006, pp. 1-70, IBM Corporation, Poughkeepsie, NY.
Tanenbaum, Andrew S., "Structured Computer Organization", 1984, Prentice-Hall, $2^{nd}$ Edition, pp. 10-12.
Final Office Action, U.S. Appl. No. 11/764,333, Sep. 2, 2011.
Office Action, U.S. Appl. No. 12/135,604, Nov. 4, 2011.
Notice of Allowance, U.S. Appl. No. 12/166,748, Nov. 9, 2011.
"MPI-2: Extensions to the Message-Passing Interface," Forum, Nov. 15, 2003.
Final Office Action, U.S. Appl. No. 12,166,748, Mar. 7, 2011.
Final Office Action, U.S. Appl. No. 11,832,192, Apr. 13, 2011.
Office Action, U.S. Appl. No. 11,764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.
Faraj, et al.; STAR-MPI: Self Tuned Adaptive Routines for MPI Collective Operations; Jun. 6, 2006; Queensland Australia.

* cited by examiner

RUNTIME OPTIMIZATION OF AN APPLICATION EXECUTING ON A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for runtime optimization of an application executing on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

Collective operations that involve data communications amongst many compute nodes may be carried out with a variety of algorithms. That is, the end result of a collective operation may be achieved in various ways. Some algorithms may provide better performance than other algorithms when operating in particular configurations. What is needed therefore is a way to optimize the selection of the best performing algorithm or set of algorithms to carry out collective operations in particular operating configurations.

SUMMARY OF THE INVENTION

Methods, apparatus, and products for runtime optimization of an application executing on a parallel computer are disclosed. In embodiments of the present invention, the parallel computer is configured with a number of compute nodes organized into a communicator and runtime optimization includes: identifying, by each compute node during application runtime, a collective operation within the application; identifying, by each compute node, a call site of the collective operation in the application; and determining, by each compute node, whether the collective operation is root-based. If the collective operation is not root-based the runtime optimization according to embodiments of the present invention includes establishing a tuning session administered by a self tuning module for the collective operation in dependence upon an identifier of the call site of the collective operation and executing the collective operation in the tuning session. If the collective operation is root-based, the runtime optimization according to embodiments of the present invention includes determining whether all compute nodes executing the application identified the collective operation at the same call site.

If all compute nodes executing the application identified the collective operation at the same call site, the runtime optimization according to embodiments of the present invention includes establishing a tuning session administered by the self tuning module for the collective operation in dependence upon the identifier of the call site of the collective operation and executing the collective operation in the tuning session. If all compute nodes executing the application did not identify the collective operation at the same call site, the runtime optimization according to embodiments of the present invention includes executing the collective operation without establishing a tuning session.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
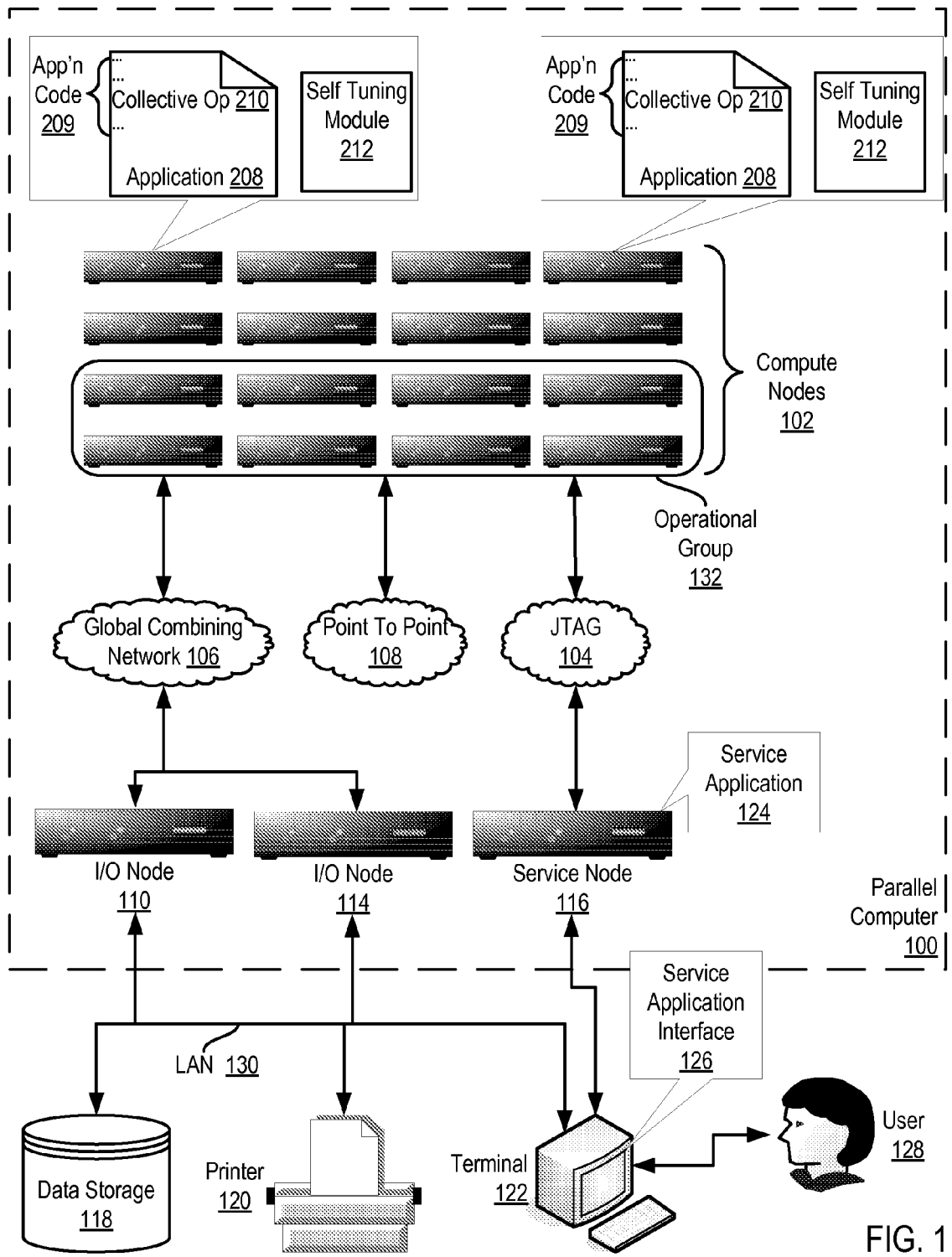
FIG. 1 illustrates an exemplary system for runtime optimization of an application executing on a parallel computer according to embodiments of the present invention.

Exemplary methods, apparatus, and products for runtime optimization of an application executing on a parallel computer in accordance with embodiments of the present invention are described with reference to the accompanying drawings, beginning with FIG. 1. FIG. 1 illustrates an exemplary system for runtime optimization of an application executing on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for runtime optimization of an application executing on a parallel computer according to embodiments of the present invention. In the example system of FIG. 1, a number of the compute nodes (102) are organized into a communicator. A communicator is a collection of one or more processes executing on compute nodes of a parallel computer. In some embodiments of the present invention each compute node executes a single process and as such a communicator is oftentimes referred to as a collection of one or more compute nodes. Readers of skill in the art will recognize, however, that a compute node may execute more than one process concurrently and each process may be organized into a separate communicator. In such embodiments, a compute node may be considered a part of multiple communicators rather than just one. Communicators connect groups of processes in a communications session, such as an MPI session. Within a communicator each contained process has an independent identifier and the contained processes may be arranged in an ordered topology. Communicators enable processes within a group to communicate amongst one another, via intracommunicator operations, and groups of processes to communicate amongst one another via, intercommunicator communications.

The system of FIG. 1 operates for runtime optimization of the application (208) executing on the parallel computer (100) by identifying, by each compute node (102) during application runtime, a collective operation (210) within the application. Application runtime as the term is used here refers to a time after the source code of the application is compiled, linked, and loaded. That is, when the application is 'running' or executing.

The system of FIG. 1 continues runtime optimization according to embodiments of the present invention by identifying, by each compute node (102), a call site of the collective operation in the application. A call site of a collective operation is a location of the function call of the collective operation in the application.

The system of FIG. 1 continues runtime optimization according to embodiments of the present invention by determining, by each compute node, whether the collective operation is root-based. A root-based collective operation is a collective operation having as a parameter of collective operation function the rank of the root node. Examples of root-based collective operations include a broadcast operation, a scatter operation, a gather operation, or a reduce operation. The root compute node of a root-based collective operation may have a different call site than all other compute nodes for the same operation. If the collective operation is not root-based, the system of FIG. 1 continues runtime optimization in accordance with embodiments of the present invention by establishing a tuning session administered by a self tuning module (212) for the collective operation in dependence upon an identifier of the call site of the collective operation and executing the collective operation in the tuning session. If the collective operation is root-based, the system of FIG. 1 continues runtime optimization according to embodiments of the present invention by determining, through use of a single other collective operation, whether all compute nodes executing the application identified the collective operation at the same call site. If all compute nodes executing the application identified the collective operation at the same call site, the system of FIG. 1 establishes a tuning session administered by the self tuning module (212) for the collective operation in dependence upon the identifier of the call site of the collective operation and executes the collective operation in the tuning session. If all compute nodes executing the application did not identify the collective operation at the same call site, the system of FIG. 1 executes the collective operation without establishing a tuning session.

In a tuning session a self tuning module iteratively, for a number of different algorithm, selects one or more algorithms to carry out a collective operation and records performance metrics of the operation of the executed collective operation. One example of a prior art self tuning module that may modified for runtime optimization in accordance with embodiments of present invention is the Self Tuned Adaptive Routines ('STAR') for MPI. STAR is a library of routines that, when linked with an MPI application, is capable of identifying an optimized communication algorithm for collective operation running within an application on a particular operating platform. The STAR library typically includes two components: a repository of algorithms and an automatic algorithm selection mechanism that is configured to select an algorithm for a collective operation of an application and/or platform that meets predefined criteria. When an MPI application invokes, at runtime, a collective operation iteratively many times, the STAR routine that realizes that operation utilizes a different algorithm or set of algorithms from the repository component of the STAR library to complete each iterative invocation of the collective operation. Each subsequent invocation of the collective operation causes the STAR routine to examine a different algorithm to carry out the collective operations, dynamically at runtime. Once all algorithms have been examined, the STAR automatic selection mechanism selects an algorithm or set of algorithms for which the performance of the execution of the collective operation met predefined performance criteria. One primary advantage to STAR is that STAR collects performance measurements of an execution of a collective operation implemented with a particular algorithm or set of algorithms, in the context of an application platform, enabling an increased accuracy and precision of measured performance.

Prior art implementations of STAR, however, provide several drawbacks. The output of STAR after collecting performance measurements and selecting algorithms, is a log file that a user must manually process to make use of. In addition, root-based MPI operations, such as a 'broadcast' or 'allreduce' operation, may hinder STAR because the root of the collective may have a call site different from other nodes for the same root-based collective. That is, call sites among the compute nodes may be different for the same root-based collective operation.

STAR also requires users or application developers to modify the application source code, including adding an extra parameter, a call site identifier, to an MPI collective operation being invoked. Because MPI collective routines may be invoked in several call sites within an application because STAR differentiates amongst call sites, the caller of a collective operation for which STAR is to tune must inform STAR of the current call site. Prior art implementations of STAR achieve this by modifying the application source code to include a unique identifier for each call site. Such modification may be inefficient and require a greater amount of computing overhead than necessary. Further, prior art implementation of STAR tune all collective operations at all message sizes and for all communicators, rather than providing tuning for a subset of collective operations.

The arrangement of nodes, networks, and I/O devices making up the exemplary system illustrated in FIG. 1 are for explanation only, not for limitation of the present invention. Data processing systems capable of runtime optimization of an application executing on a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers configured according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Runtime optimization of an application executing on a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of runtime optimization of an application executing on the parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (208), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is a self tuning module (212), a module of computer program instructions that carries out runtime optimization of the application (208) on the parallel computer of which the compute node (152) is a part. The self tuning module (212) prior to runtime is linked with the application (208) in such a way that the application, when executing, calls collective operations through a call to a library function provided by the self tuning module (212) rather than a typical call to the messaging module (160). At runtime of the application (208), therefore, when the application (208) identifies a collective operation (210), that 'encounters' a collective operation, within the application, the compute node (152), through the self tuning module (212), identifies a call site (214) of the collective operation (210) in the application (208).

Figure 2:
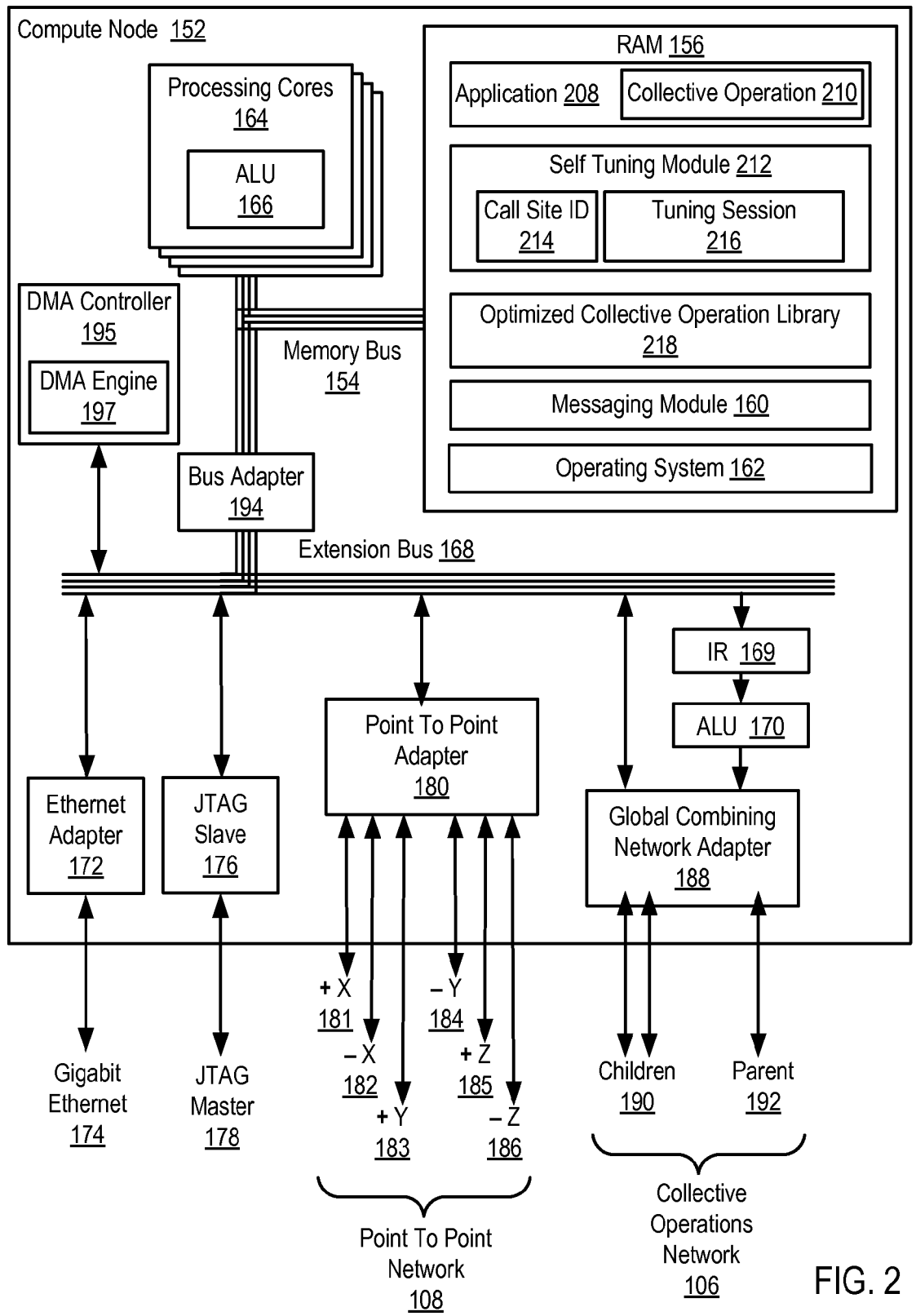
FIG. 2 sets forth a block diagram of an exemplary compute node useful in a parallel computer capable of runtime optimization of an application executing on the parallel computer according to embodiments of the present invention.

The example compute node (152) of FIG. 2, through the self tuning module (212) also determines whether the collective operation (210) is root-based. If the collective operation is not root-based, the self tuning module (212) establishes a tuning session (216) administered by the self tuning module (212) for the collective operation (210) in dependence upon an identifier of the call site, a call site ID (214), of the collective operation and executes the collective operation (210) in the tuning session (216). Executing a collective operation (210) in a tuning session is carried out by executing the collective operation iteratively with a number of different algorithms or sets of algorithms and collective performance metrics of each iterative execution.

If the collective operation is root-based, the example compute node (152) of FIG. 2 determines, through use of a single other collective operation—a collective operation other than the collective operation (210) identified in the application (208)—whether all compute nodes executing the application identified the collective operation at the same call site. If all compute nodes executing the application identified the collective operation at the same call site, the self tuning module may establish a tuning session administered by the self tuning module for the collective operation in dependence upon the identifier of the call site of the collective operation and execute the collective operation in the tuning session. If all compute nodes executing the application did not identify the collective operation at the same call site, the compute node (152) may execute the collective operation without establishing a tuning session.

During finalization of the application (208), the self tuning module (212) may select, for a particular collective operation of the application, such as collective operation (210), in dependence upon one or more tuning sessions (216) for the particular collective operation, one or more algorithms to carry out the particular collective operation upon subsequent executions of the application (208). The one or more algorithms selected to carry out the particular collective operation represent an optimized set of algorithms (including one or more algorithms) to carry out the particular collective operation. The self tuning module (212) may record the one or more selected algorithms. In the example compute node (152) of FIG. 2, the self tuning module (212) records selected algorithms in a data structure globally available to all compute nodes (152) in the communicator, in an optimized collective operation library (218). The library is linked with the application (208) upon executions subsequent to initial self tuning and provides the application with functions that return the selected algorithms for a particular collective operation (210) in the application (208) when invoked or called by the application. That is, during a subsequent execution of the application (208) and without performing another tuning session, the application (208), through utilization of the optimized collective operation library, may carry out the particular collective operation (210) of the application (208) with the recorded selected algorithms that represent optimized algorithms.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems that provide runtime optimization of an application executing on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in runtime optimization of an application executing on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
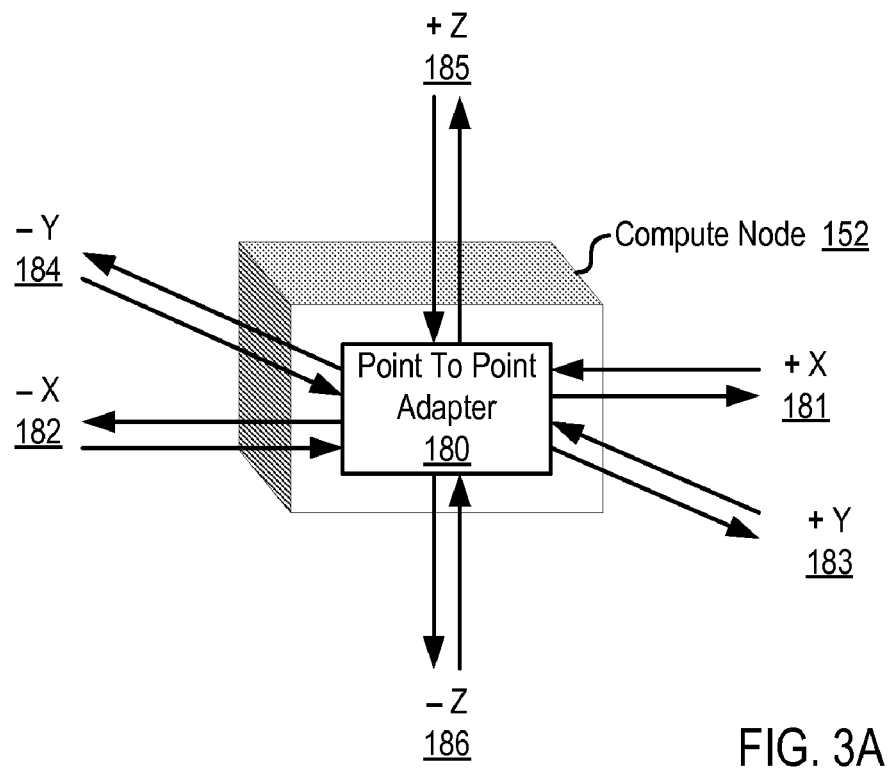
FIG. 3A illustrates an exemplary Point To Point Adapter useful in systems capable of runtime optimization of an application executing on a parallel computer according to embodiments of the present invention.

For further explanation, FIG. 3A illustrates an exemplary Point To Point Adapter (180) useful in systems capable of runtime optimization of an application executing on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
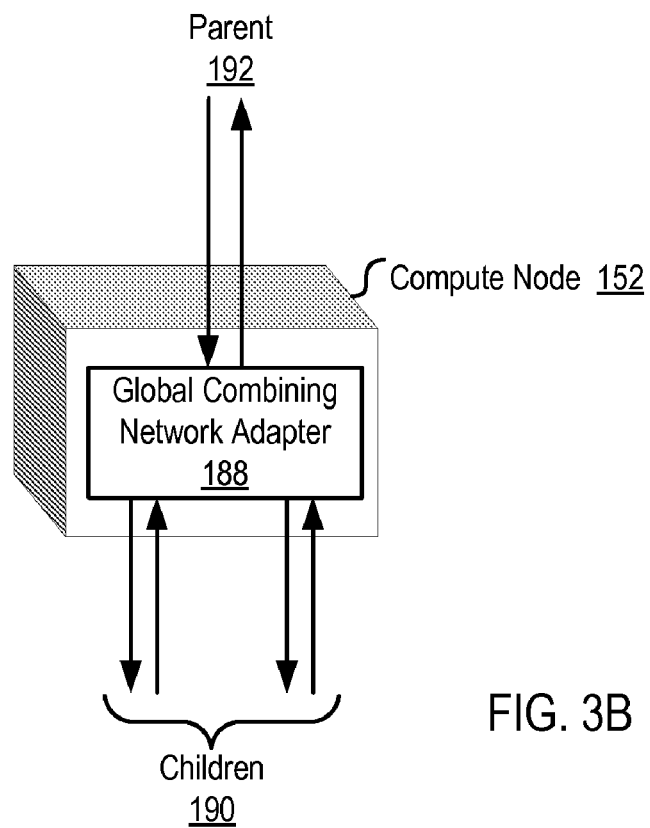
FIG. 3B illustrates an exemplary Global Combining Network Adapter useful in systems capable of runtime optimization of an application executing on a parallel computer according to embodiments of the present invention.

For further explanation, FIG. 3B illustrates an exemplary Global Combining Network Adapter (188) useful in systems capable of runtime optimization of an application executing on a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
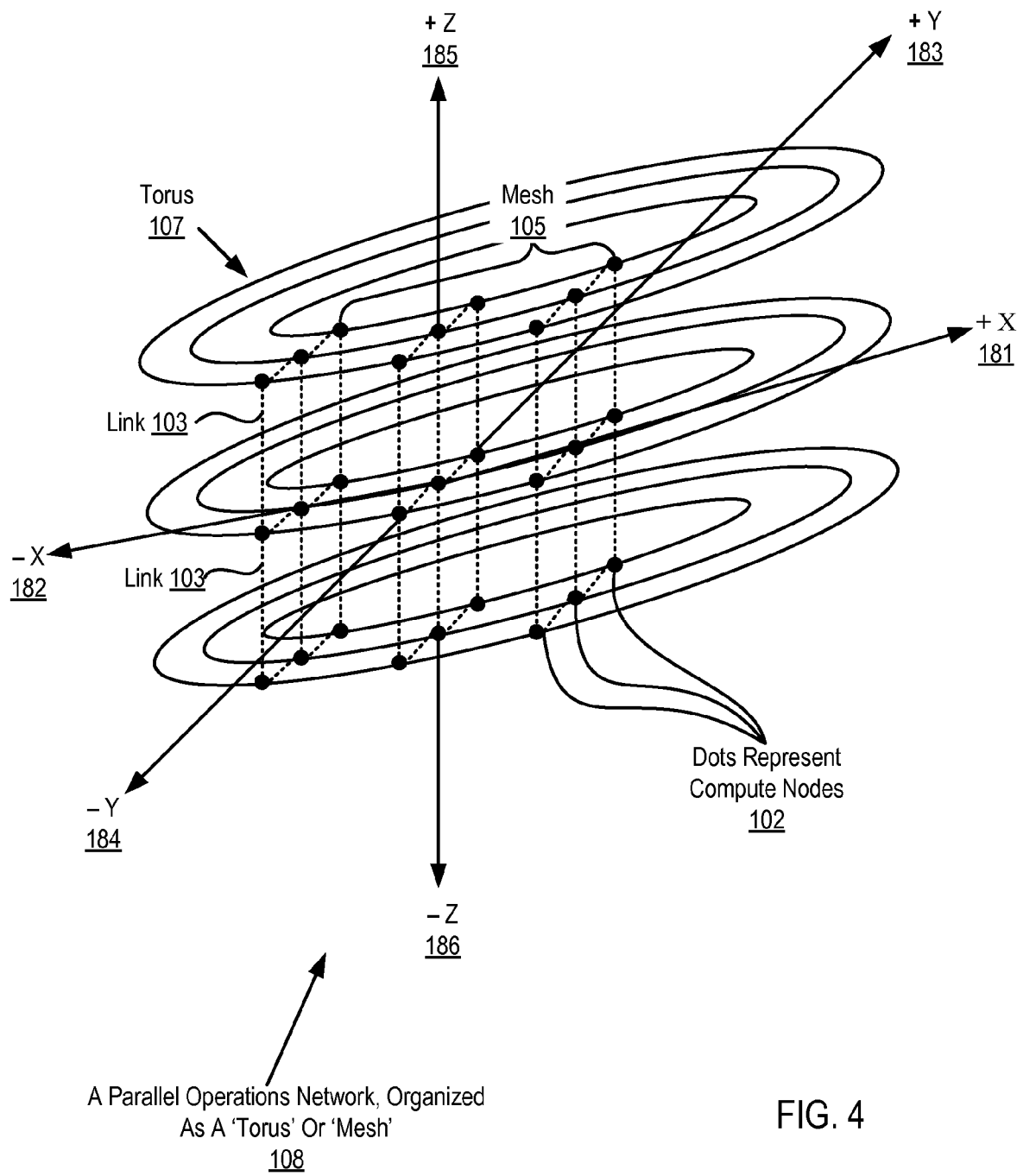
FIG. 4 sets forth a line drawing illustrating an exemplary data communications network optimized for point to point operations useful in systems capable of runtime optimization of an application executing on a parallel computer in accordance with embodiments of the present invention.

For further explanation, FIG. 4 sets forth a line drawing illustrating an exemplary data communications network (108) optimized for point to point operations useful in systems capable of runtime optimization of an application executing on a parallel computer accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in runtime optimization of an application executing on a parallel computer in accordance with embodiments of the present invention may contain only a few compute nodes or may contain thousands of compute nodes.

Figure 5:
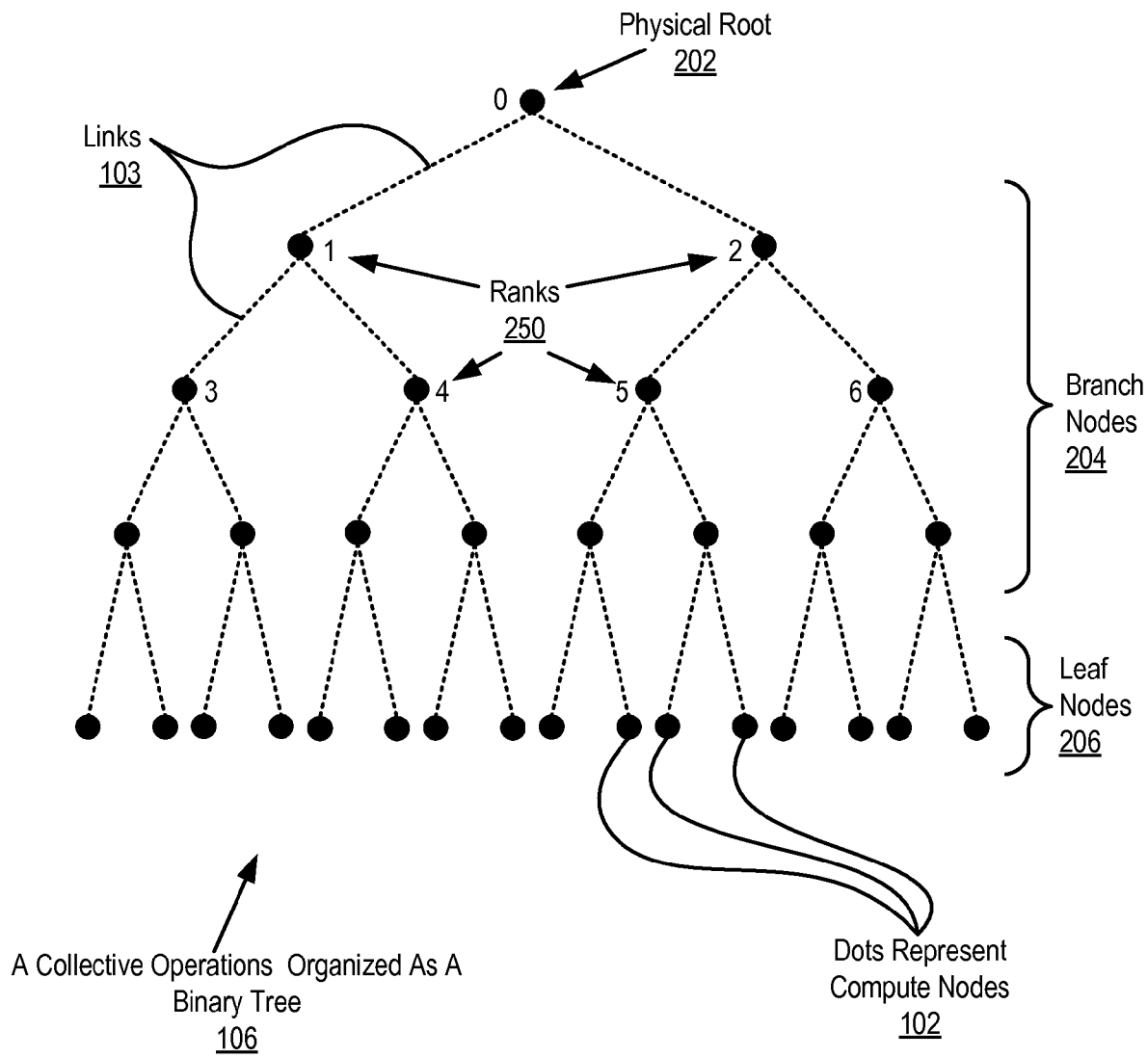
FIG. 5 sets forth a line drawing illustrating an exemplary data communications network optimized for collective operations useful in systems capable of runtime optimization of an application executing on a parallel computer in accordance with embodiments of the present invention.

For further explanation, FIG. 5 sets forth a line drawing illustrating an exemplary data communications network (106) optimized for collective operations useful in systems capable of runtime optimization of an application executing on a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems that provide runtime optimization of an application executing on a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
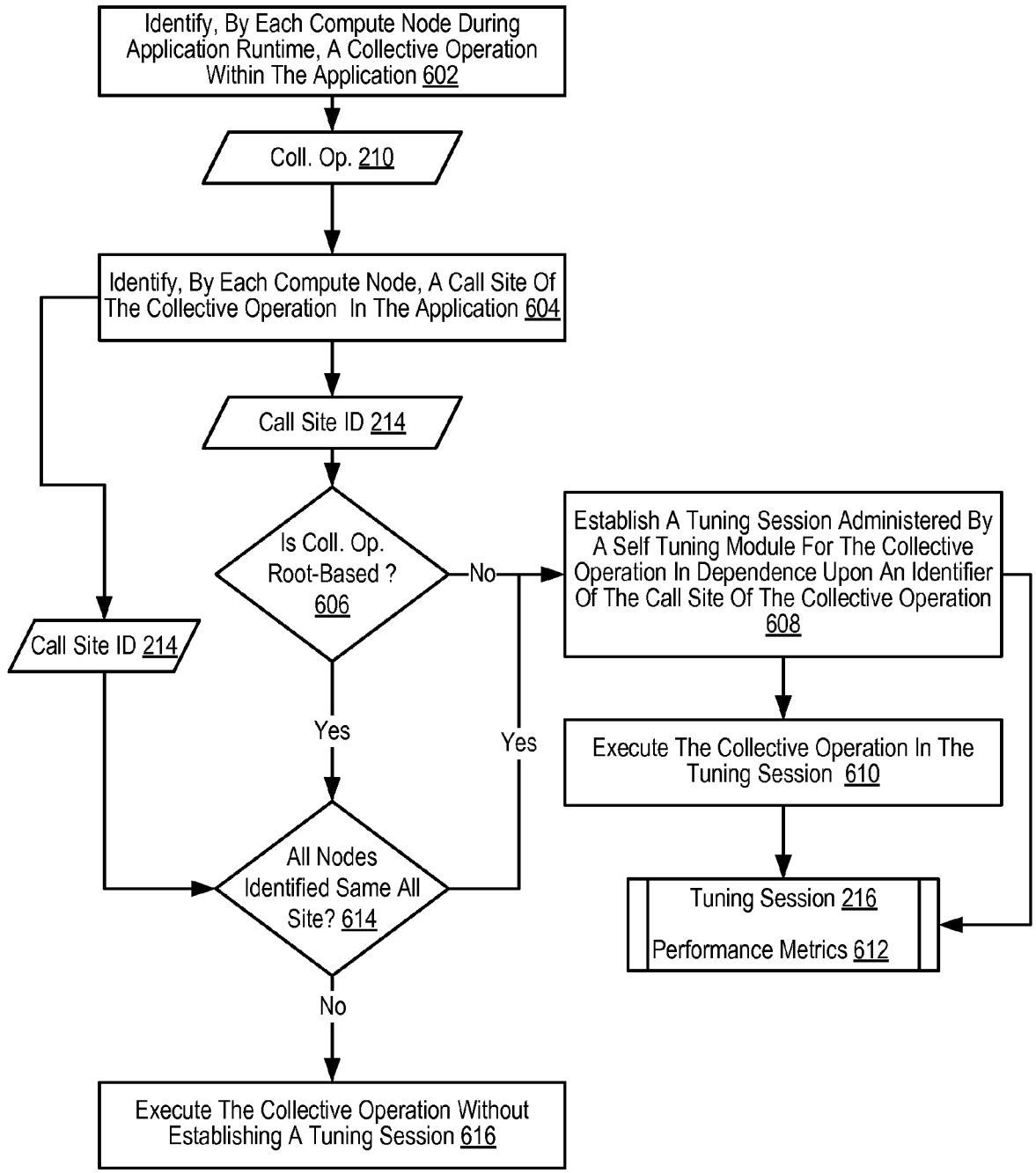
FIG. 6 sets forth a flow chart illustrating an exemplary method of runtime optimization of an application executing on a parallel computer according to embodiments of the present invention.

For further explanation, FIG. 6 sets forth a flow chart illustrating an exemplary method of runtime optimization of an application executing on a parallel computer according to embodiments of the present invention. In the method of FIG. 6, the parallel computer includes a plurality of compute nodes organized into a communicator. The method of FIG. 6 includes identifying (602), by each compute node during application runtime, a collective operation (210) within the application. The method of FIG. 6, also includes identifying (604), by each compute node, a call site (214) of the collective operation in the application.

The method of FIG. 6 also includes determining (606), by each compute node, whether the collective operation is root-based. If the collective operation is not root-based, the method of FIG. 6 continues by establishing (608) a tuning session (216) administered by a self tuning module for the collective operation in dependence upon an identifier of the call site of the collective operation and executing (610) the collective operation in the tuning session. Executing (610) the collective operation in the tuning session (216) may include storing performance metrics (612) in the tuning session (216).

If the collective operation is root-based, the method of FIG. 6 continues by determining (614), through use of a single other collective operation, whether all compute nodes executing the application identified the collective operation at the same call site (214). If all compute nodes executing the application identified the collective operation at the same call site, the method of FIG. 6 continues by establishing (608) a tuning session (216) administered by the self tuning module for the collective operation in dependence upon the identifier of the call site of the collective operation and executing (610) the collective operation in the tuning session. If all compute nodes executing the application did not identify the collective operation at the same call site, the method of FIG. 6 continues by executing (616) the collective operation without establishing a tuning session (216).

Figure 7:
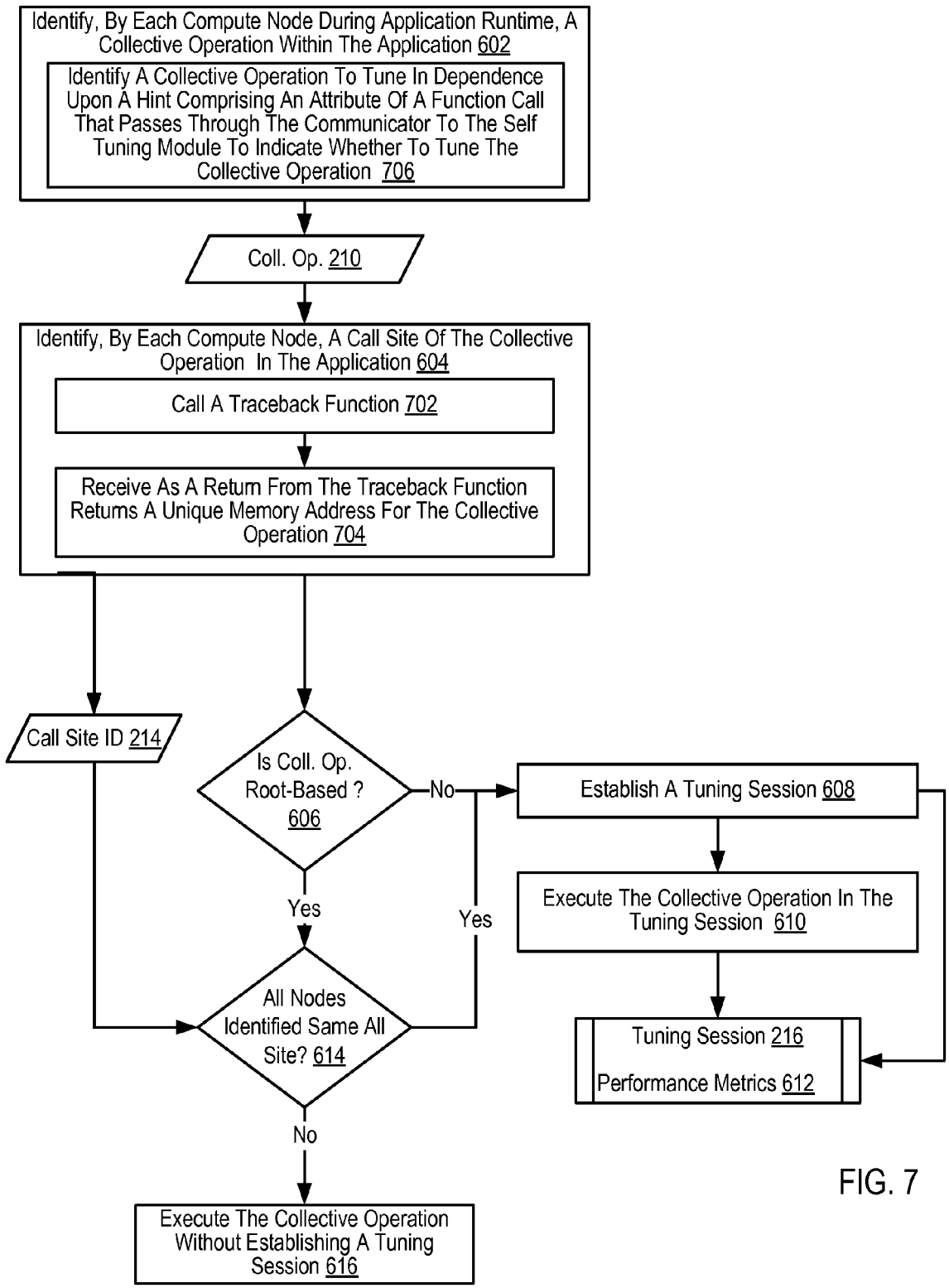
FIG. 7 sets forth a flow chart illustrating a further exemplary method of runtime optimization of an application executing on a parallel computer according to embodiments of the present invention.

For further explanation, FIG. 7 sets forth a flow chart illustrating a further exemplary method of runtime optimization of an application executing on a parallel computer according to embodiments of the present invention. The method of FIG. 7 is similar to the method of FIG. 6 in that the method of FIG. 7 is carried out by compute nodes of a parallel computer and the compute nodes are organized into a communicator. The method of FIG. 7 is also similar to the method of FIG. 6 in that the method of FIG. 7 includes identifying (602) a collective operation (210); identifying (604) a call site of the collective operation in the application; determining (606) whether the collective operation is root-based; if the collective operation is not root-based: establishing (608) a tuning session (216) and executing (610) the collective operation (210) in the tuning session; if the collective operation is root-based, determining (614) whether all compute nodes identified the same call site; if all compute nodes identified the same call site, establishing (608) a tuning session and executing (610) the collective operation in the tuning session; and if all compute nodes did not identify the same call site, executing (616) the collective operation without establishing a tuning session.

The method of FIG. 7 differs from the method of FIG. 6, however, in that in the method of FIG. 7, identifying (602) a collective operation within the application includes identifying (706) a collective operation to tune in dependence upon a hint comprising an attribute of a function call that passes through the communicator to the self tuning module to indicate whether to tune the collective operation. In MPI, each collective operation includes a communicator parameter. In accordance with some embodiments of the present invention, this communicator parameter may be modified to include a hint attribute, one or more bits for example, that indicate whether to tune a particular collective operation. Such hints enable an application developer to selectively indicate those collective operation the developer intends to tune and those the developer intends to not tune.

In the method of FIG. 7, identifying (604) a call site of the collective operation in the application is carried out by calling (702) a traceback function and receiving (704) as a return from the traceback function a unique memory address for the collective operation. The application executing on each compute node, being linked with self tuning module prior to execution, may encounter a collective operation and execute the collective operation with a call to the self tuning module rather than a standard messaging module. The self tuning module, upon receipt of such a call, initially determines the call site by calling the traceback function. The traceback function returns an array of pointer addresses that represents a sequence of calls or invocations of functions. Each pointer address is unique to a particular call site and may be composed in various ways, including for example, as a composition of a caller's name or identification and an offset from a point "0" to the point in the code at which the function is called. The self tuning module may identify by the call site of the collective operation by determining the address in the pointer array returned from the traceback function corresponding to the call executed previous to the traceback function.

Figure 8:
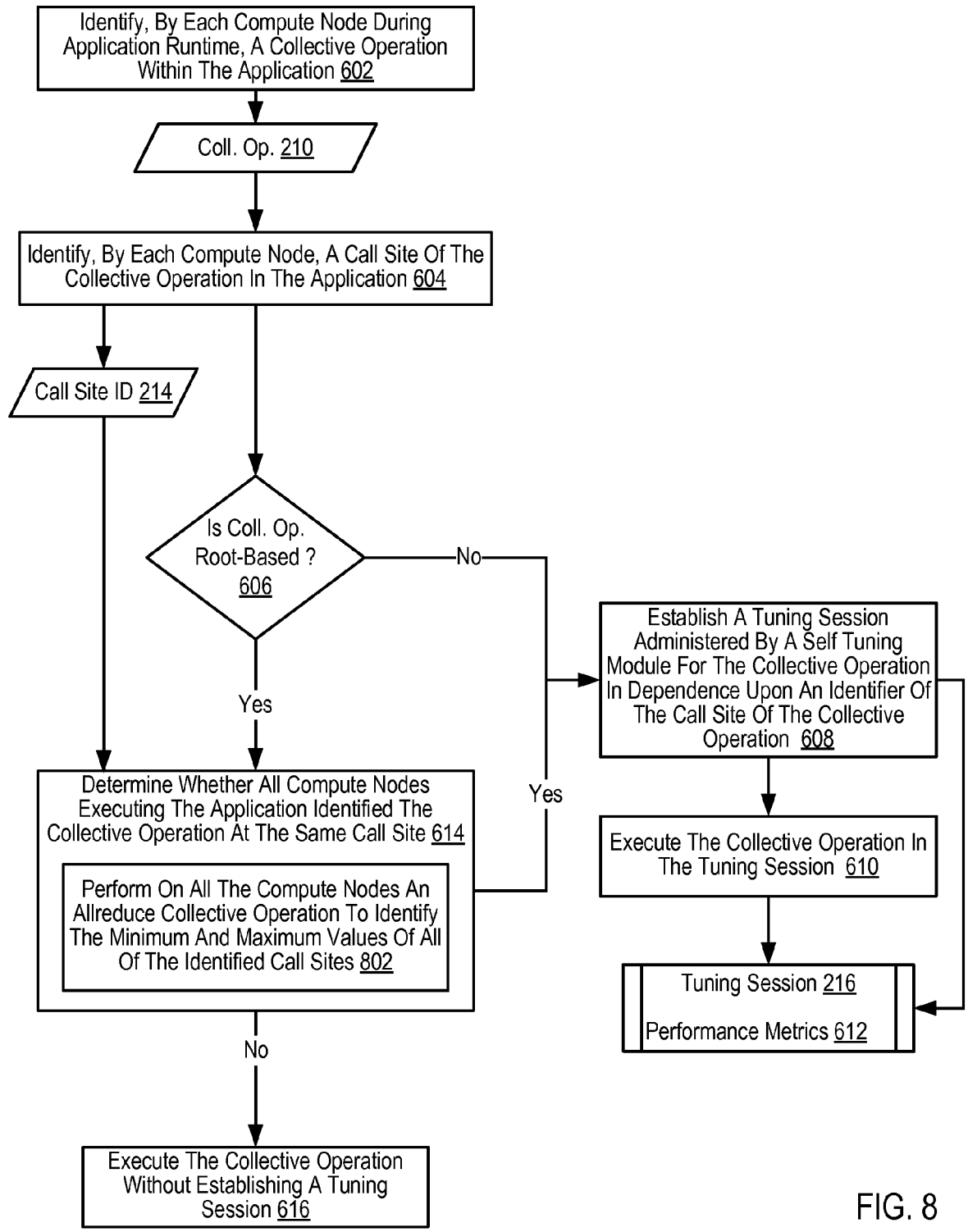
FIG. 8 sets forth a flow chart illustrating a further exemplary method of runtime optimization of an application executing on a parallel computer according to embodiments of the present invention.

For further explanation, FIG. 8 sets forth a flow chart illustrating a further exemplary method of runtime optimization of an application executing on a parallel computer according to embodiments of the present invention. The method of FIG. 8 is similar to the method of FIG. 6 in that the method of FIG. 8 is carried out by compute nodes of a parallel computer and the compute nodes are organized into a communicator. The method of FIG. 8 is also similar to the method of FIG. 6 in that the method of FIG. 8 includes identifying (602) a collective operation (210); identifying (604) a call site of the collective operation in the application; determining (606) whether the collective operation is root-based; if the collective operation is not root-based: establishing (608) a tuning session (216) and executing (610) the collective operation (210) in the tuning session; if the collective operation is root-based, determining (614) whether all compute nodes identified the same call site; if all compute nodes identified the same call site, establishing (608) a tuning session and executing (610) the collective operation in the tuning session; and if all compute nodes did not identify the same call site, executing (616) the collective operation without establishing a tuning session.

The method of FIG. 8 differs from the method of FIG. 6, however, in that determining (614) whether all compute nodes executing the application identified the collective operation at the same call site is carried out by performing (802) on all the compute nodes of the communicator an 'allreduce' collective operation to identify the minimum and maximum values of all of the identified call sites. If the minimum and maximum values are the same, all compute nodes identified the same call site. To reduce the overhead of determining whether all nodes identified the same call site, a single allreduce operation is carried out, rather than two. The following pseudocode is an example of determining, by a compute node, whether all nodes identified the same call site:

```
int Bcast( )
{
  int tmp[2], result[2];
  tmp[0] = call_site_id;
  tmp[1] = ~call_site_id;
  MPI_Allreduce(tmp, result, 2, MPI_UNSIGNED_LONG, MPI_MAX,
    comm);
  if (result[0] != (~result[1]))
    same_call_site = 0;
}
```

In the psuedocode example above, the compute node declares two arrays each having two elements: 'tmp' and 'result.' In the first element of 'tmp,' the compute node stores the present value of the call site identifier of the collective operation. In the second element 'tmp,' the compute node stores the negative of the call site identifier. The allreduce function includes as parameters, the source or send buffer, 'tmp,' the number of elements of the send buffer, two, the data type of elements, and the communicator identifier. The allreduce operation when executed finds the maximum value of the positive call site identifier among all compute nodes in the communicator and the maximum value of the negative call site identifier among all compute nodes in the communicator. The maximum of the negative call site identifiers among all compute nodes is the negative of the minimum call side identifier among all compute nodes. The results of the allreduce, the maximum of the positive call site IDs and the maximum of the negative call site IDs, is stored in the compute node's receive buffer—the 'result' array. The compute node then determines if the maximum call site identifier among all compute nodes (the first element of the 'result' array) is not equal to the negative maximum of the negative call site identifiers (the second element in the 'result' array and the minimum call site identifier). If the two are not equal, then at least one compute node identified the collective operation at a different call site. Readers of skill in the art will recognize, that although the above pseudocode example utilizes the MPI_Max operation, the MPI_Min operation, finding the minimum rather than the maximum, may be utilized to achieve the same results.

Figure 9:
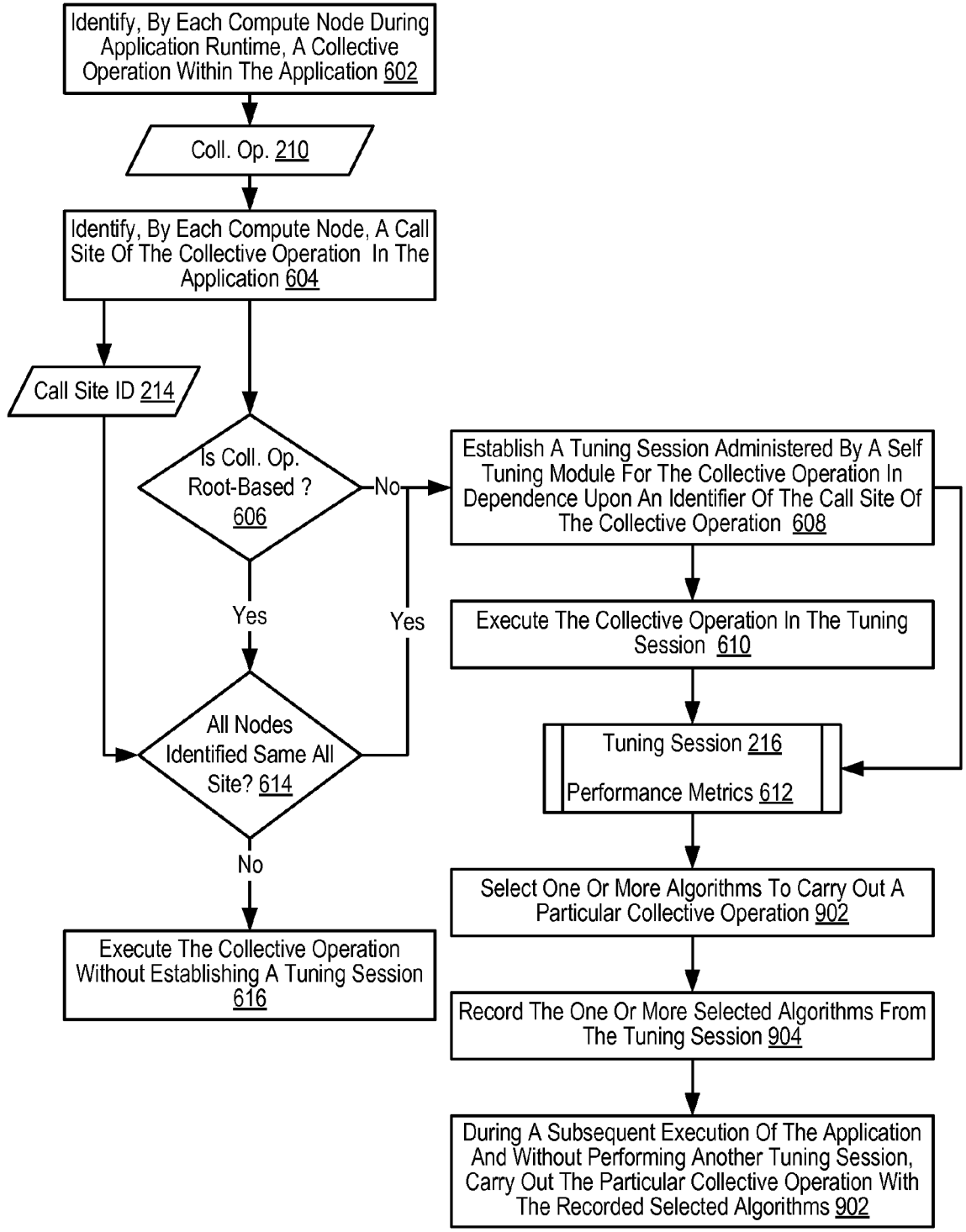
FIG. 9 sets forth a flow chart illustrating a further exemplary method of runtime optimization of an application executing on a parallel computer according to embodiments of the present invention.

For further explanation, FIG. 9 sets forth a flow chart illustrating a further exemplary method of runtime optimization of an application executing on a parallel computer according to embodiments of the present invention. The method of FIG. 9 is similar to the method of FIG. 6 in that the method of FIG. 9 is carried out by compute nodes of a parallel computer and the compute nodes are organized into a communicator. The method of FIG. 9 is also similar to the method of FIG. 6 in that the method of FIG. 9 includes identifying (602) a collective operation (210); identifying (604) a call site of the collective operation in the application; determining (606) whether the collective operation is root-based; if the collective operation is not root-based: establishing (608) a tuning session (216) and executing (610) the collective operation (210) in the tuning session; if the collective operation is root-based, determining (614) whether all compute nodes identified the same call site; if all compute nodes identified the same call site, establishing (608) a tuning session and executing (610) the collective operation in the tuning session; and if all compute nodes did not identify the same call site, executing (616) the collective operation without establishing a tuning session.

Figure 10:
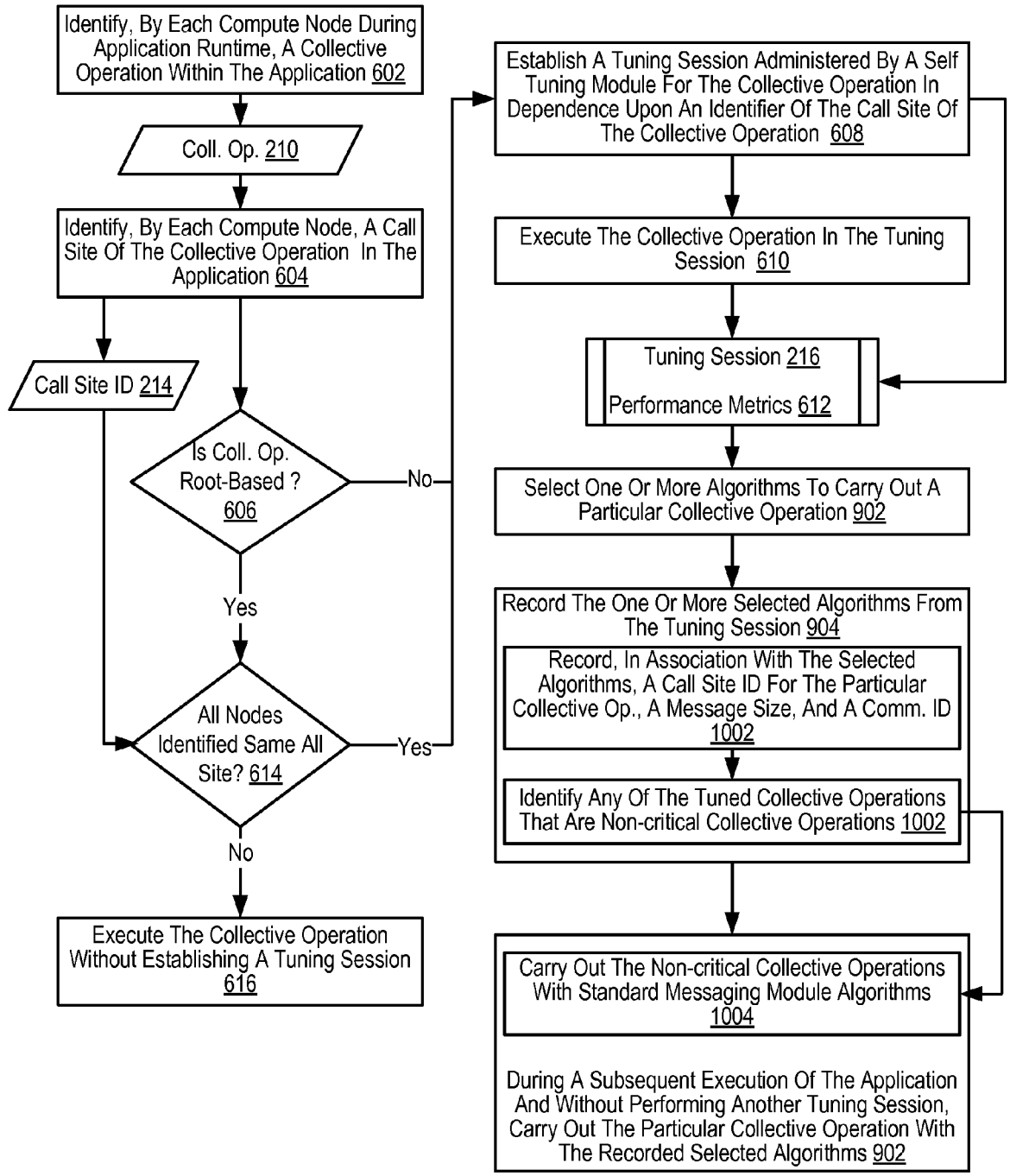
FIG. 10 sets forth a flow chart illustrating a further exemplary method of runtime optimization of an application executing on a parallel computer according to embodiments of the present invention.

The method of FIG. 9 differs from the method of FIG. 10 in that the method of FIG. 9 includes selecting (902), for a particular collective operation of the application in dependence upon one or more tuning sessions for the particular collective operation, one or more algorithms to carry out the particular collective operation upon subsequent executions of the application. In the method of FIG. 9, the one or more algorithms represent an optimized set of algorithms to carry out the particular collective operation. The method of FIG. 10 also includes recording (904) the one or more selected algorithms. During a subsequent execution of the application and without performing another tuning session, the method of FIG. 10 includes carrying (902) out the particular collective operation of the application with the recorded selected algorithms. In this way, the application may be optimized after only a single execution.

Further explanation of the recording (904) and carrying out (902) of the application of FIG. 9, FIG. 10 sets forth a flow chart illustrating a further exemplary method of runtime optimization of an application executing on a parallel computer according to embodiments of the present invention. Recording (904) the one or more selected algorithms for the tuning session may be carried out when the finalization of application runtime, such as, for example, in response to an MPI_finalize function call.

In the method of FIG. 10, recording (904) the one or more selected algorithms from the tuning session is carried out by recording (1002), in association with the one or more selected algorithms, an identifier of the call site (214) for the particular collective operation, a message size, and a communicator identifier. The associated data may be stored as a global data structure in a custom library that may be queried upon subsequent executions of the application. On a subsequent execution of the application, the custom library may be compiled and linked with the application, such that when a collective operation is invoked, a signature for the collective operation (the associated data mentioned above) is created dynamically during runtime and passed as an attribute to a 'find_best_algorithm( )' function. The 'find_best_function' algorithm may search the global data structure for a matching signature and returns the previously selected, optimized algorithms which are then invoked to carry out the collective operation.

Also in the method of FIG. 10, recording (1002) the one or more selected algorithms from the tuning session includes identifying (1002) any of the tuned collective operations that are non-critical collective operations and carrying (1004) out the particular collective operation includes carrying out the non-critical collective operations with standard messaging module algorithms. Non-critical collective operations may be of two types: operations with a low number of invocations and low weight (total execution time), or operations for which the selected algorithms match standard messaging module algorithms.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of runtime optimization of an application executing on a parallel computer, the parallel computer having a plurality of compute nodes organized into a communicator, the method comprising:
    identifying, by each compute node during application runtime, a collective operation within the application;
    identifying, by each compute node, a call site of the collective operation in the application;
    determining, by each compute node, whether the collective operation is root-based;
    if the collective operation is not root-based: establishing a tuning session administered by a self tuning module for the collective operation in dependence upon an identifier of the call site of the collective operation and executing the collective operation in the tuning session;
    if the collective operation is root-based, determining, through use of a single other collective operation, whether all compute nodes executing the application identified the collective operation at the same call site;
    if all compute nodes executing the application identified the collective operation at the same call site, establishing a tuning session administered by the self tuning module for the collective operation in dependence upon the identifier of the call site of the collective operation and executing the collective operation in the tuning session; and
    if all compute nodes executing the application did not identify the collective operation at the same call site, executing the collective operation without establishing a tuning session.

2. The method of claim 1 wherein a root-based collective operation comprises one of: a broadcast operation, a scatter operation, a gather operation, or a reduce operation.

3. The method of claim 1 wherein identifying a collective operation within the application further comprises identifying a collective operation to tune in dependence upon a hint comprising an attribute of a function call that passes through the communicator to the self tuning module to indicate whether to tune the collective operation.

4. The method of claim 1 wherein identifying the call site of the collective operation in the application further comprises calling a traceback function and receiving as a return from the traceback function a unique memory address for the collective operation.

5. The method of claim 1 wherein determining whether all compute nodes executing the application identified the collective operation at the same call site further comprising performing on all the compute nodes of the communicator a single 'allreduce' collective operation to identify the minimum and maximum values of all of the identified call sites.

6. The method of claim 1 further comprising:
    selecting, for a particular collective operation of the application in dependence upon one or more tuning sessions for the particular collective operation, one or more algorithms to carry out the particular collective operation upon subsequent executions of the application, the one or more algorithms representing an optimized set of algorithms to carry out the particular collective operation;
    recording the one or more selected algorithms; and
    during a subsequent execution of the application and without performing another tuning session, carrying out the particular collective operation of the application with the recorded selected algorithms.

7. The method of claim 6 wherein recording the one or more selected algorithms from the tuning session further comprises recording, in association with the one or more selected algorithms, an identifier of the call site for the particular collective operation, a message size, and a communicator identifier.

8. The method of claim 6 wherein:
    recording the one or more selected algorithms from the tuning session further comprises identifying any of the tuned collective operations that are non-critical collective operations; and
    carrying out the particular collective operation of the application with the recorded selected algorithms further comprises carrying out the non-critical collective operations with standard messaging module algorithms.

9. An apparatus for runtime optimization of an application executing on a parallel computer, the parallel computer having a plurality of compute nodes organized into a communicator, the apparatus comprising a computer processor and a computer memory operatively coupled to the computer processor, the computer memory having disposed within it computer program instructions capable of:
    identifying, by each compute node during application runtime, a collective operation within the application;
    identifying, by each compute node, a call site of the collective operation in the application;

determining, by each compute node, whether the collective operation is root-based;

if the collective operation is not root-based: establishing a tuning session administered by a self tuning module for the collective operation in dependence upon an identifier of the call site of the collective operation and executing the collective operation in the tuning session;

if the collective operation is root-based, determining whether all compute nodes executing the application identified the collective operation at the same call site;

if all compute nodes executing the application identified the collective operation at the same call site, establishing a tuning session administered by the self tuning module for the collective operation in dependence upon the identifier of the call site of the collective operation and executing the collective operation in the tuning session; and if all compute nodes executing the application did not identify the collective operation at the same call site, executing the collective operation without establishing a tuning session.

10. The apparatus of claim 9 wherein a root-based collective operation comprises one of: a broadcast operation, a scatter operation, a gather operation, or a reduce operation.

11. The apparatus of claim 9 wherein identifying a collective operation within the application further comprises identifying a collective operation to tune in dependence upon a hint comprising an attribute of a function call that passes through the communicator to the self tuning module to indicate whether to tune the collective operation.

12. The apparatus of claim 9 wherein identifying the call site of the collective operation in the application further comprises calling a traceback function and receiving as a return from the traceback function a unique memory address for the collective operation.

13. The apparatus of claim 9 wherein determining whether all compute nodes executing the application identified the collective operation at the same call site further comprising performing on all the compute nodes of the communicator an 'allreduce' collective operation to identify the minimum and maximum values of all of the identified call sites.

14. The apparatus of claim 9 further comprising computer program instructions capable of:

selecting, for a particular collective operation of the application in dependence upon one or more tuning sessions for the particular collective operation, one or more algorithms to carry out the particular collective operation, the one or more algorithms representing an optimized set of algorithms to carry out the particular collective operation;

recording the one or more selected algorithms; and during a subsequent execution of the application and without performing another tuning session, carrying out the particular collective operation of the application with the recorded selected algorithms.

15. The apparatus of claim 14 wherein recording the one or more selected algorithms from the tuning session further comprises recording, in association with the one or more selected algorithms, an identifier of the call site for the particular collective operation, a message size, and a communicator identifier.

16. The apparatus of claim 14 wherein:

recording the one or more selected algorithms from the tuning session further comprises identifying any of the tuned collective operations that are non-critical collective operations; and carrying out the particular collective operation of the application with the recorded selected algorithms further comprises carrying out the non-critical collective operations with standard messaging module algorithms.

17. A computer program product for runtime optimization of an application executing on a parallel computer, the parallel computer having a plurality of compute nodes organized into a communicator, the computer program product disposed in a computer readable storage medium, the computer program product comprising computer program instructions capable of:

identifying, by each compute node during application runtime, a collective operation within the application;

identifying, by each compute node, a call site of the collective operation in the application;

determining, by each compute node, whether the collective operation is root-based;

if the collective operation is not root-based: establishing a tuning session administered by a self tuning module for the collective operation in dependence upon an identifier of the call site of the collective operation and executing the collective operation in the tuning session;

if the collective operation is root-based, determining whether all compute nodes executing the application identified the collective operation at the same call site;

if all compute nodes executing the application identified the collective operation at the same call site, establishing a tuning session administered by the self tuning module for the collective operation in dependence upon the identifier of the call site of the collective operation and executing the collective operation in the tuning session; and if all compute nodes executing the application did not identify the collective operation at the same call site, executing the collective operation without establishing a tuning session.

18. The computer program product of claim 17 wherein a root-based collective operation comprises one of: a broadcast operation, a scatter operation, a gather operation, or a reduce operation.

19. The computer program product of claim 17 wherein identifying a collective operation within the application further comprises identifying a collective operation to tune in dependence upon a hint comprising an attribute of a function call that passes through the communicator to the self tuning module to indicate whether to tune the collective operation.

20. The computer program product of claim 17 wherein identifying the call site of the collective operation in the application further comprises calling a traceback function and receiving as a return from the traceback function a unique memory address for the collective operation.

21. The computer program product of claim 17 wherein determining whether all compute nodes executing the application identified the collective operation at the same call site further comprising performing on all the compute nodes of the communicator an 'allreduce' collective operation to identify the minimum and maximum values of all of the identified call sites.

22. The computer program product of claim 17 further comprising computer program instructions capable of:

selecting, for a particular collective operation of the application in dependence upon one or more tuning sessions for the particular collective operation, one or more algorithms to carry out the particular collective operation, the one or more algorithms representing an optimized set of algorithms to carry out the particular collective operation;

recording the one or more selected algorithms; and
during a subsequent execution of the application and without performing another tuning session, carrying out the particular collective operation of the application with the recorded selected algorithms.

23. The computer program product of claim 22 wherein recording the one or more selected algorithms from the tuning session further comprises recording, in association with the one or more selected algorithms, an identifier of the call site for the particular collective operation, a message size, and a communicator identifier.

24. The computer program product of claim 22 wherein:
recording the one or more selected algorithms from the tuning session further comprises identifying any of the tuned collective operations that are non-critical collective operations; and
carrying out the particular collective operation of the application with the recorded selected algorithms further comprises carrying out the non-critical collective operations with standard messaging module algorithms.

\* \* \* \* \*